United States Patent [19]

Barton, Jr. et al.

[11] 4,206,890
[45] Jun. 10, 1980

[54] TAPE POSITION SENSING APPARATUS FOR MAGNETIC TAPE DRIVE

[75] Inventors: William M. Barton, Jr., San Diego; Martin D. Gray, La Jolla, both of Calif.

[73] Assignee: Cipher Data Products, Incorporated, San Diego, Calif.

[21] Appl. No.: 938,380

[22] Filed: Aug. 31, 1978

[51] Int. Cl.² ............................................. G11B 15/58
[52] U.S. Cl. ................................................... 242/184
[58] Field of Search ............... 242/184, 183, 185, 182; 226/118, 95

[56] References Cited

U.S. PATENT DOCUMENTS

| | | | |
|---|---|---|---|
| 3,106,357 | 10/1963 | Kobayashi et al. | 242/184 |
| 3,122,332 | 2/1964 | Hughes, Jr. | 242/184 |
| 3,261,563 | 7/1966 | Aweida et al. | 242/184 |

FOREIGN PATENT DOCUMENTS 1362356  4/1964  France ..................................... 242/185

Primary Examiner—George F. Mautz
Attorney, Agent, or Firm—Brown & Martin

[57] ABSTRACT

The disclosed apparatus includes a hollow column for receiving a loop of magnetic tape. A slot runs along the length of this column. A rigid conductive strip lies spaced apart from and parallel to the slot; and a flexible conductive strip lies between the rigid conductive strip and the slot. The two conductive strips form the plates of a variable capacitor. A vacuum is generated in the portion of the column lying beneath the magnetic tape loop to force a corresponding portion of the flexible conductive strip against the perimeter of the slot. Further, a partial vacuum is generated at the outside of the column near the conductive strips to force the portion of the flexible conductive strip lying above the tape loop against the rigid conductive strip. Air escape passages are included in the rigid conductive strip. As the two strips are forced together, any air lying therebetween instantaneously escapes through the passages. This substantially decreases errors between tape position and instantaneous capacitance between the plates.

9 Claims, 5 Drawing Figures

TAPE POSITION SENSING APPARATUS FOR MAGNETIC TAPE DRIVE

BACKGROUND OF THE INVENTION

This invention relates to magnetic tape drives, and more particularly to apparatus for sensing the position of a magnetic tape in the vacuum columns of a drive. Basically, vacuum columns are included in a tape drive to allow the tape to be accelerated at a rate faster than the acceleration of the tape reels. By providing a vacuum column between each tape reel and a read/write head, tape may be moved in or out of the columns until the reel velocity equals the tape velocity across the head.

In order for such a system to operate properly, it is necessary to sense the position of the tape in the vacuum columns. Otherwise, the tape could get completely pulled out of one of the vacuum columns and tear. Alternatively, the tape could completely fill one of the vacuum columns which also would cause a malfunction. These problems are overcome by sensing the position of the tape in the columns and by accelerating the tape reel in response thereto.

A variety of tape position sensing apparatus has been described in the prior art. One such apparatus that is currently widely used operates on a capacitive sensing principal. Basically, in this apparatus, movement of the tape in the vacuum columns causes a corresponding movement between two plates of a variable capacitor. And by electronically sensing this capacitance, the tape position is determined.

One problem however, with this prior apparatus is that a time lag exists between the instantaneous position of the tape in the vacuum column and the corresponding instantaneous capacitance of the variable capacitor. Primarily, this time lag is caused by air bubbles getting trapped between the plates of the variable capacitor as they are moved together. As a result, the capacitance of the variable capacitor is less than it should be. These air bubbles typically take several milliseconds to escape from between the capacitor plates. Thus, the instantaneous position of the tape in the vacuum cannot be determined accurately from the instantaneous capacitance reading. This of course, limits the tape speed, and the rate at which the data can be read from or written thereto.

Accordingly, it is one object of the invention to provide a magnetic tape having an improved tape position sensing apparatus.

Another object of the invention is to provide an improved variable capacitor suitable for sensing the position of a magnetic tape in a vacuum column.

Still another object of the invention is to provide a magnetic tape position sensing apparatus that is essentially free from capacitance variations caused by air bubbles being temporarily trapped between the capacitive plate.

SUMMARY OF THE INVENTION

These and other objects are accomplished in accordance with the invention by a magnetic tape drive wherein the vacuum columns have a slot running along the length thereof. An enclosure extends over the slot to an outside surface of the vacuum column. A rigid conductive strip, having air escape passages therein, lies within the enclosure. This strip is spaced apart from and parallel to the slot; and it forms a first plate of the variable capacitor. A flexible conductive strip also lies within the enclosure. The flexible strip lies between and parallel to the slot and the rigid conductive strip. If forms a second plate of the variable capacitor.

In operation, a vacuum is generated in the portion of the column lying beneath the magnetic tape loop. This forces a corresponding portion of the flexible conductive strip against the perimeter of the slot. Further, a partial vacuum is generated in the enclosure. This forces the portion of the flexible conductive strip lying above the tape loop against the rigid conductive strip. As the two conductive strips are forced together, no air is temporarily trapped therebetween because the air escape passages in the rigid conductive strip provide a place for the air to instantaneously escape. In one embodiment, the air escape passages consist of a plurality of holes through the rigid conductive strip. A wire mesh, or a vector board may suitably be used. In another embodiment, the air escape passages consist of a plurality of grooves on the surface of the rigid conductive strip that faces the flexible conductive strip.

BRIEF DESCRIPTION OF THE DRAWING

The preferred embodiment of the invention disclosed herein will best be understood by reference to the following drawings and the accompanying detailed description wherein.

DETAILED DESCRIPTION

Figure 1:
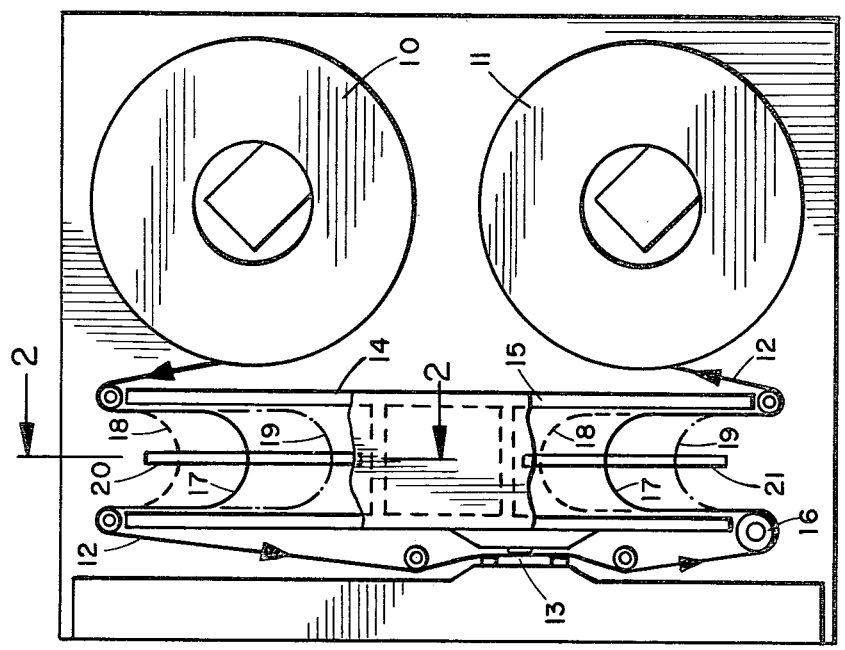
FIG. 1 is a front view of a tape drive constructed according to the invention.

Referring now to FIG. 1, an improved magnetic tape drive that is constructed according to the invention will be described. This tape drive includes a pair of tape reels 10 and 11. A tape 12 extends from one of the reels along a predetermined path over a read/write head 13 to the other reel. In order to prevent tape 12 from tearing while it moves along this path, there is also provided a pair of vacuum columns 14 and 15. One loop of tape 12 from reel 10 is placed in column 14; while one loop of tape 12 from reel 11 is placed in column 15.

In operation, the length of the tape loop in each of the columns depends on the direction in which the tape is being moved. It further depends on the relative velocity between a capstan 16 and the tape reels. When the tape reels are not moving, tape 12 is at position 17 in the vacuum columns. In comparison, when the tape reels are moving clockwise, tape 12 is at position 18; whereas when the reels are moving counter clockwise, tape 12 is at position 19.

The reason for this movement of the tape loop in the vacuum column is that capstan 16 has a much lower inertia than tape reels 10 and 11. As a result, capstan 16 accelerates faster than does the tape reels. Accordingly, when the tape reels are accelerated in a clockwise direction, more tape is taken from column 14 that is put into it. Conversely, when the tape reels are accelerated in a counter clockwise direction, more tape is put into column 14 than is taken from it.

In order to insure that this difference inertia does not cause the tape to tear, it is necessary for the position of the tape in the columns to be sensed. Based on this position, the reel acceleration is then either increased or decreased from some nominal acceleration rate. This insures that the tape is not pulled completely out of (or does not completely fill) one of the columns.

Figure 2:
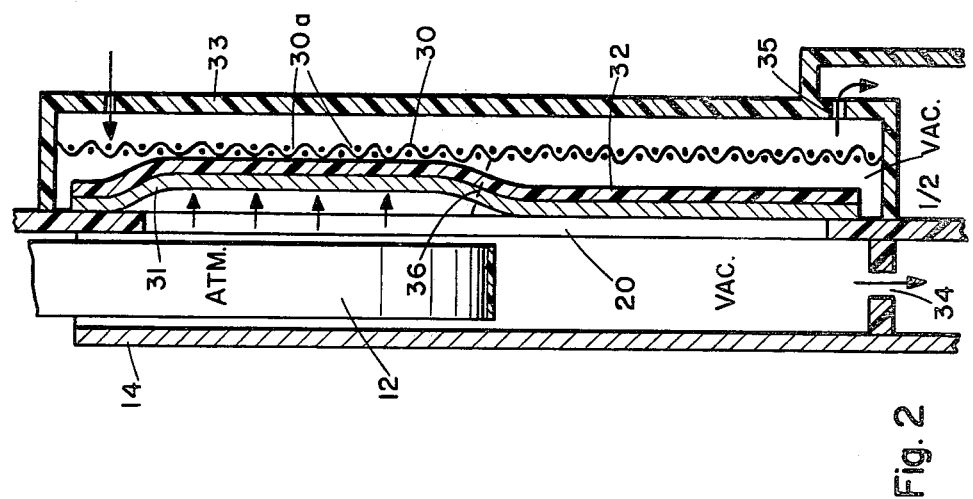
FIG. 2 is a cross-sectional view taken through the position sensing apparatus of FIG. 1.

To accomplish this position sensing, there is included in column 14 a slot 20. A variable capacitor lies behind this slot; and it operates to sense the position of the tape where it crosses the slot. FIG. 2 is a cross-sectional view of the variable capacitor. The cross-section is taken along lines 2—2. of slot 20. A slot 21 having a similar variable capacitor lying behind is included behind column 15.

As FIG. 2 illustrates, the variable capacitor includes a rigid conductive strip 30, and a flexible conductive strip 31. Strip 30 lies spaced apart from and parallel to slot 20, while strip 31 lies between strip 30 and slot 20. Also, preferably an insulator 32 lies on the surface of strip 31 which faces strip 30. Further, an enclosure 33 covers strips 30 and 31 and extends to an outside surface of the column.

During operation, a vacuum is generated in the portion of column 14 that lies beneath the loop of tape 12. Suitably, this vacuum is generated by sucking air through an opening 34 at the bottom of column 14. Also, a partial vacuum is generated within enclosure 33. This partial vacuum may suitably be generated by sucking air through an opening 35 that is substantially smaller in area than opening 34.

Due to these pressure differences, the portion of flexible strip 31 that lies beneath tape loop 12 is forced against a corresponding portion of the perimeter of slot 20. At the same time, the portion of strip 31 that lies above tape loop 12 is forced against a corresponding portion of strip 30.

Thus, a bend 36 is formed in conductive strip 31; and the location of this bend varies in accordance with the position of the bottom tape loop 12. For example, as the tape loop moves from position 18 to position 19, the location of bend 36 will also move in a similar manner. As this occurs, it is critical that no air gets temporarily trapped between strips 30 and 31. The trapping of any air bubbles between the strips will cause their spacing to increase; and this in turn, causes the capacitance between strips 30 and 31 to decrease. And since capacitance between plates 30 and 31 is intended to be a measure of the position of loop 12 in the column, a decrease in the capacitance produces an erroneous sensing of position.

To prevent this error, strip 30 includes a plurality of air escape passages 30a. Preferably, these air escape passages consist of a plurality of holes through strip 30. In the illustrated embodiment, strip 30 is a wire screen. Suitably, the screen may have approximately 200 holes per square inch; however, the number of holes is not critical. Thus, in another preferred embodiment, strip 30 consists of a vector board having only approximately 20 holes per square inch.

Figure 5:
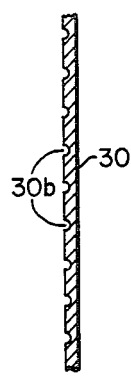
FIG. 5 is a fragmentary cross-sectional view of an alternate embodiment of the rigid conductive strip forming a part of the position sensing apparatus and showing the grooves formed on one surface thereof.

In still another preferred embodiment, the air escape passages consist of a plurality of grooves 30b on the surface of strip 30 that face stip 31 as shown in FIG. 5. These grooves act in the manner similar to the grooves that are placed in a road for preventing water build up under an automobile tire. The grooves may have a variety of shapes and sizes. They may run parallel to, or perpendicular to slot 20 for example.

Figure 3:
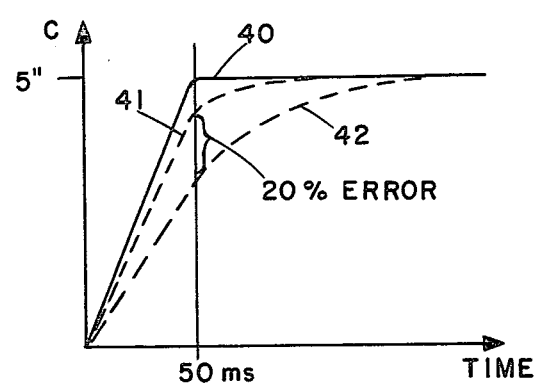
FIG. 3 is a set of curves illustrating the performance characteristics of the disclosed apparatus in comparison to the prior art.

A substantial improvement in the accuracy with which the position of tape 12 is sensed, is achieved due to these air escape passages. This improvement is illustrated by the curves of FIG. 3. In that figure, a curve 40 represents the position of the bottom of tape loop 12 as it is moved a total of five inches in column 14 during a period of 50 milliseconds. Further, a curve 41 represents the capacitance between plates 30 and 31; whereas a curve 42 represents the capacitance between similar plates which have no air escape passages.

Due to the temporary trapping of air bubbles between surfaces such as 30 and 31 which have no air escape passages, curve 42 always lies beneath curve 41. A maximum deviation between these curves of approximately 20% occurs near the point where the tape loop stops moving. Thereafter, this deviation is reduced to zero as the trapped air bubbles eventually escape. However, as tape speeds become faster and faster, the time interval in which this air may acceptably escape without losing control of the tape, becomes proportionally shorter. Further, as tape speeds increase, the amount of air that gets trapped also increases. Thus, deciations in capacitance sensed by the disclosed method and the prior art is most critical in high speed tapes.

Figure 4:
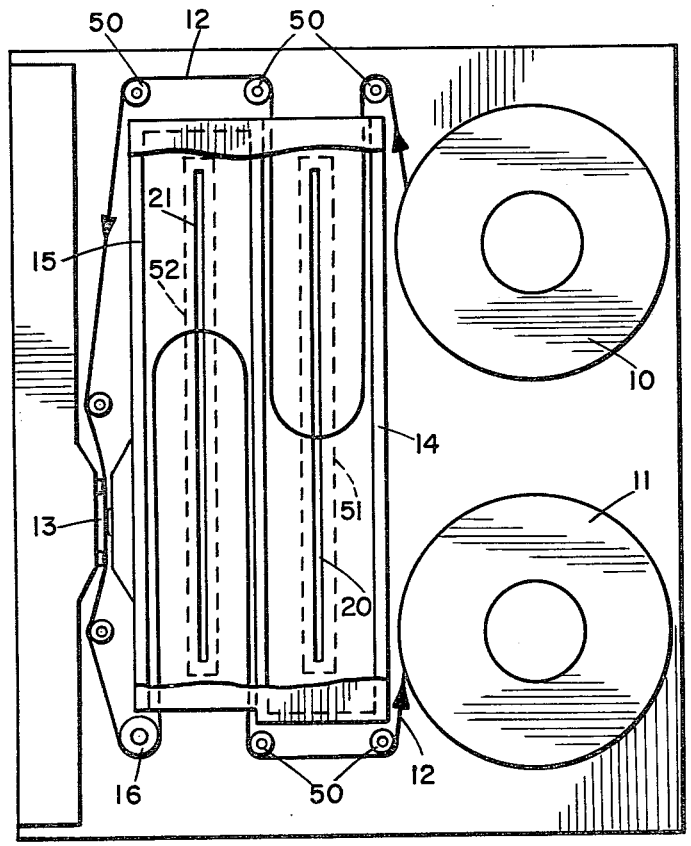
FIG. 4 is a front view of another tape drive constructed according to the invention.

A front view of a relatively high speed tape drive that incorporates the disclosed invention is illustrated in FIG. 4. This embodiment is similar to the FIG. 1 embodiment and like parts have like reference numerals. However, in the FIG. 4 embodiment vacuum columns 14 and 15 are placed along side of each other. This allows their length to be substantially longer than the columns of FIG. 1. In FIG. 4, columns 14 and 15 run alongside of alomost the entire height of the tape drive. Suitably, each of these columns may be approximately 20 inches long. A plurality of rollers 50 direct the tape 12 to and from these columns.

A dashed line 51 in column 14 indicates the perimeter of the variable capacitor plates 30 and 31 behind slot 20. Similarly, a dashed line 52 in column 15 indicates the perimeter of the variable capacitor plates behind slot 21. A cross-sectional ciew of these plates is similar to that illustrated in the cross-section of FIG. 2. Also, the structure of the air escape passages 30a in plate 30 is the same as was described above. These passages are particularly important in the FIG. 4 embodiment, since the relatively long vacuum columns permit the tape speed to be increased, which in turn increases the amount of air that is trapped.

Various preferred embodiments of the invention have now been described in detail. In addition, many changes and modifications may be made thereto without departing from the nature and spirit of the invention. Therefore, since many changes and modifications can be made, it is to be understood that the invention is not limited to said details but is defined by the appended claims.

We claim:

1. A magnetic tape drive including improved variable capacitor apparatus for sensing the position of a magnetic tape in a vacuum column of said drive, wherein said apparatus comprises;

a hollow column having an open end for receiving a loop of said magnetic tape, and having a slot running along the length thereof;

an enclosure extending over said slot to an outside surface of said vacuum column;

a rigid conductive strip of wire mesh lying within said enclosure spaced apart from and parallel to said slot to form a first plate of said variable capacitor;

a flexible conductive strip, within said enclosure, lying between and parallel to said slot and said rigid conductive strip to form a second plate of said variable capacitor;

means for generating a vacuum in the portion of said column lying beneath said magnetic tape loop to thereby force a corresponding portion of said flexible conductive strip against the perimeter of said slot; and means for generating a partial vacuum in said enclosure to thereby force the portion of said flexible conductive strip lying above said tape loop against said rigid conductive strip such that any air that lies therebetween instantaneously escapes through said mesh.

2. A magnetic tape drive according to claim 1 wherein said mesh contains approximately 200 holes per square inch.

3. A magnetic tape drive including improved variable capacitor apparatus for sensing the position of a magnetic tape in a vacuum column of said drive, wherein said apparatus comprises;

a hollow column having an open end for receiving a loop of said magnetic tape, and having a slot running along the length thereof;

an enclosure extending over said slot to an outside surface of said vacuum column;

a rigid conductive strip having a plurality of grooves on one surface thereof lying within said enclosure spaced apart from and parallel to said slot with said grooves facing said slot to form a first plate of said variable capacitor;

a flexible conductive strip, within said enclosure, lying between and parallel to said slot and said rigid conductive strip to form a second plate of said variable capacitor;

means for generating a vacuum in the portion of said column lying beneath said magnetic tape loop to thereby force a corresponding portion of said flexible conductive strip against the perimeter of said slot; and means for generating a partial vacuum in said enclosure to thereby force the portion of said flexible conductive strip lying above said tape loop against said rigid conductive strip such that any air that lies therebetween instantaneously escapes through said grooves.

4. A magnetic tape drive according to claim 3 wherein said grooves lie perpendicular to the length direction of said slot.

5. A magnetic tape drive including improved variable capacitor apparatus for sensing the position of a magnetic tape in a vacuum column of said drive, wherein said apparatus comprises;

a hollow column having an open end for receiving a loop of said magnetic tape, and having a slot running along the length thereof;

an enclosure extending over said slot to an outside surface of said vacuum column;

a rigid conductive strip of vector board lying within said enclosure spaced apart from and parallel to said slot to form a first plate of said variable capacitor;

a flexible conductive strip, within said enclosure, lying between and parallel to said slot and said rigid conductive strip to form a second plate of said variable capacitor;

means for generating a vacuum in the portion of said column lying beneath said magnetic tape loop to thereby force a corresponding portion of said flexible conductive strip against the perimeter of said slot; and means for generating a partial vacuum in said enclosure to thereby force the portion of said flexible conductive strip lying above said tape loop against said rigid conductive strip such that any air that lies therebetween instantaneously escapes through said vector board.

6. A magnetic tape drive according to claim 5 wherein said vector board contains approximately 20 holes per square inch.

7. An improved method for sensing the position of a magnetic tape in a vacuum column of a tape drive comprised of the steps of;

feeding a loop of said magnetic tape into the open end of a hollow column having a slot running along the length thereof;

placing a rigid conductive strip of wire mesh spaced apart from and parallel to said slot to form a first plate of a variable capacitor;

placing a flexible conductive strip between and parallel to said slot and said rigid conductive strip to form a second plate of said variable capacitor;

generating a vacuum in the portion of said column lying beneath said magnetic tape loop to thereby force a corresponding portion of said flexible conductive strip against the perimeter of said slot; and generating a partial vacuum outside of said column near said slot to thereby force the portion of said flexible conductive strip lying above said tape loop against said rigid conductive strip such that any air that lies therebetween instantaneously escapes through said mesh.

8. An improved method for sensing the position of a magnetic tape in a vacuum column of a tape drive comprised of the steps of;

feeding a loop of said magnetic tape into the open end of a hollow column having a slot running along the length thereof;

placing a rigid conductive strip having a plurality of grooves on one surface thereof spaced apart from and parallel to said slot with said grooves facing said slot to form a first plate of a variable capacitor;

placing a flexible conductive strip between and parallel to said slot and said rigid conductive strip to form a second plate of said variable capacitor;

generating a vacuum in the portion of said column lying beneath said magnetic tape loop to thereby force a corresponding portion of said flexible conductive strip against the perimeter of said slot; and generating a partial vacuum outside of said column near said slot to thereby force the portion of said flexible conductive strip lying above said tape loop against said rigid conductive strip such that any air that lies therebetween instantaneously escapes through said grooves.

9. An improved method for sensing the position of a magnetic tape in a vacuum column of a tape drive comprised of the steps of;

feeding a loop of said magnetic tape into the open end of a hollow column having a slot running along the length thereof;

placing a rigid conductive strip of vector board spaced apart from and parallel to said slot to form a first plate of a variable capacitor;

placing a flexible conductive strip between and parallel to said slot and said rigid conductive strip to form a second plate of said variable capacitor;

generating a vacuum in the portion of said column lying beneath said magnetic tape loop to thereby force a corresponding portion of said flexible conductive strip against the perimeter of said slot; and generating a partial vacuum outside of said column near said slot to thereby force the portion of said flexible conductive strip lying above said tape loop against said rigid conductive strip such that any air that lies therebetween instantaneously escapes through said vector board.

* * * * *